United States Patent [19]

Newman

[11] 3,936,559
[45] Feb. 3, 1976

[54] PRESSURE-SENSITIVE TRANSFER ELEMENTS

[75] Inventor: Douglas A. Newman, Glen Cove, N.Y.

[73] Assignee: Columbia Ribbon and Carbon Manufacturing Co., Inc., Glen Cove, N.Y.

[22] Filed: Mar. 5, 1973

[21] Appl. No.: 337,926

Related U.S. Application Data

[62] Division of Ser. No. 117,162, Feb. 19, 1971, abandoned.

[52] U.S. Cl. .............. 428/212; 428/217; 428/320; 428/483; 428/484; 428/510; 428/515; 428/516; 428/518; 428/520; 156/240; 156/244; 156/280; 197/172; 427/146; 427/152; 427/412

[51] Int. Cl.² .......................................... B32B 7/02

[58] Field of Search ........... 161/166, 164, 233, 252, 161/254, 231; 117/36.1, 36.3, 36.4, 76 F, 138.8 E; 156/240, 244, 280; 428/483,320, 217, 212, 510, 515–516, 518, 520

[56] References Cited
UNITED STATES PATENTS

| | | | |
|---|---|---|---|
| 3,037,879 | 6/1952 | Newman et al. | 117/36.1 |
| 3,061,886 | 11/1962 | Seager et al. | 117/120 X |
| 3,186,861 | 6/1965 | Smith et al. | 117/36.1 |
| 3,370,951 | 2/1968 | Hasenauer et al. | 117/76 F X |
| 3,442,680 | 5/1969 | Newman | 117/36.1 |
| 3,471,360 | 10/1969 | Newman | 161/227 |
| 3,641,204 | 2/1972 | Lundberg et al. | 161/252 X |
| 3,682,764 | 8/1972 | Findlay et al. | 428/320 |
| 3,684,544 | 8/1972 | Piron | 156/240 X |
| 3,753,828 | 8/1973 | Manne et al. | 428/483 X |

*Primary Examiner*—George F. Lesmes
*Assistant Examiner*—Patricia C. Ives
*Attorney, Agent, or Firm*—Thomas L. Tully; Arthur A. Johnson

[57] ABSTRACT

Pressure-sensitive transfer sheets and ribbons having a flexible plastic foundation carrying a colored layer comprising pressure-transferable imaging material, the plastic foundation consisting of a laminate of two different plastic films, one of which is stronger and less deformable than the other.

6 Claims, No Drawings

PRESSURE-SENSITIVE TRANSFER ELEMENTS

This application is a division of application Ser. No. 117,162, filed Feb. 19, 1971, now abandoned.

It is recognized in the carbon paper and typewriter ribbon field that plastic film foundations offer many advantages over paper foundations for a variety of end usages. In cases where a complete release of the transferable layer is desired, as with executive-type single-use ribbons for quality copy, plastic foundations are used because they permit the complete release of the frangible transfer layer. U.S. Pat. No. 3,061,886 is illustrative of such ribbons. Also, in cases where reusability is most important and complete release is not desirable, plastic foundations are used in that they do not absorb oil from the so-called squeeze-out type resinous ink layer and thus result in carbon papers and ribbons which do not dry out or lose their imaging strength on aging. U.S. Pat. No. 3,037,879 is illustrative of such transfer elements.

The most important difficulty encountered in the prior art is the requirement for the co-existence of contradictory properties in the film foundation. The most popular film is polyethylene terephthalate polyester, commercially available under the trademark Mylar. This material is exceptionally strong and tear-resistant, but due to its strength Mylar is not very deformable about the type face under the effects of typing pressure and therefore the quality of the typed images is reduced. Other films such as polyethylene and polypropylene and the like are soft and deform easily about the type face but have the disadvantage that they are weak and tear or break more readily than Mylar during handling and use.

Another important disadvantage of the prior art film ribbons is their tendency to expand or contract with changes in temperature and humidity so that the ribbons either expand and unravel and telescope from the core or contract tightly on the core so that at least a portion of the transferable layer transfers to the back of the film against which it is tightly wound when the ribbon is unwound during use. While this problem is, to some extent, also due to the contemporaneous expansion and contraction of the transferable layer, the film foundation compounds the problem rather than stabilizing thereagainst.

The present invention is concerned with providing transfer sheets and ribbons with plastic film foundations which are exceptionally strong and tear-resistant and which nevertheless are exceptionally deformable about the type face under the effects of typing pressure.

The present invention is also concerned with providing such sheets and ribbons which are more resistant to changes in dimensions with changes in temperature and humidity.

The objects and advantages of the present invention are accomplished by the discovery that an ideal film foundation having exceptional impact strength, deformability and dimensional stability may be produced by laminating together two thin films, one of which has good impact strength and the other of which has good deformability. In some unexplainable manner the combination results in a film having the best properties of each of the components. While it would be expected that the weaker film having good deformability would be strengthened by lamination to the stronger, less-deformable film, it is unexpected that the stronger film would be rendered more deformable by lamination to the second film. Also, it is unexpected that the bi-film laminate has greater dimensional stability under the effects of changes in temperature and humidity than either of the two films alone. This appears to be the result of the two films having different expansion coefficients so that one remains stable when the other tends to be affected by heat or humidity, and the stable film restrains the other film from changing dimensions.

The bi-film foundations of the present invention consist of a lamination of two individual films, each having a maximum caliper of 1 mil and preferably having a maximum caliper of 0.5 mil. The lower end of the thickness range for each film is governed in most cases by commercial availability and appears to be about 0.2 mil.

The preferred strong film is Mylar which has an impact strength of about 70 kg/cm but other similar films having impact strengths in excess of about 40 kg/cm may also be used such as polyvinyl fluoride (Teslar), polyvinyl chloride, chlorinated rubber (Pliofilm) and similar films having high strength and relatively low deformability. Impact strength is determined by the falling ball method using films 1 mil thick.

The preferred weak film is polyethylene which has an impact strength of about 15 kg/cm but other similar films may also be used which have impact strengths below about 20 kg/cm such as polypropylene, polyvinylidene chloride (saran), cellophane, cellulose acetate films and similar films having relative low strength and good deformability.

The films are laminated to each other in conventional manner using a thin adhesive coating between the films or by extruding the films together into intimate contact with each other while still soft so that a bond is formed therebetween. When using an adhesive coating, it is preferred to apply to one of the films a heat-activatable adhesive which is non-tacky when cold, so that the films can be easily superposed in registration prior to lamination. The films are pressed into intimate contact and subjected to heat to activate the adhesive and bond the films together. Canadian Pat. Nos. 578,286 and 712,135 teach compositions and methods for adhesively bonding films to each other.

Another advantage of the present film foundations is that they provide different surfaces having different adhesion properties with respect to the imaging layer. Wax-base, hot-melt transfer layers are oleophilic and have a strong affinity for polyolefin film foundations and a poor affinity for Mylar. Water-applied solvent coatings have a poor affinity for polyolefin films and a better affinity for Mylar. Similarly, the two films are generally soluble in different solvents so that the imaging layer may be solvent-bonded to one film using a solvent which does not attack the other film so that the strength of the foundation is not greatly impaired.

The following examples are given by way of illustration and should not be considered limitative.

EXAMPLE 1

A bi-film foundation is formed by extruding films of polyethylene terephthalate polyester and polyethylene, each having a caliper of 0.25 mil, and pressing the films together while both are still tacky to form a unitary film having a caliper of 0.5 mil.

This film foundation is then coated on the polyethylene surface with a 0.05 mil thick layer of the following hot-melt composition:

| Ingredients | Parts by Weight |
|---|---|
| Carnauba wax | 41 |
| Beeswax | 4 |
| Lanolin | 5 |
| Mineral oil | 20 |
| Methyl violet base | 1 |
| Dye toned black | 15 |
| Lecithin | 1 |

The coated web may be cut into sheets or ribbons having excellent strength, deformability and dimensional stability and which function as single-use elements for the formation of exceptionally sharp images under the effects of imaging pressure.

EXAMPLE 2

A bi-film foundation is formed by first applying to a 0.5 mil film of polyvinyl fluoride a thin continuous coating of polystyrene dissolved in butyl acetate and evaporating the solvent to form a polystyrene layer of about 0.0001 inch thickness. The coated side of the polyvinyl fluoride is then placed against a 0.5 mil film of polyvinylidene chloride (saran) and the combination is passed in the nip of heated rollers to press the films intimately together while heating the polystyrene to about 150° C to tackify the polystyrene and cause it to bond to the saran and form a unitary film having a caliper slightly in excess of 1 mil.

This film foundation is then coated on the saran surface with the following ink solution and heat is applied to evaporate the solvents and produce a solidified ink layer having a thickness of about 0.6 mil. Prior to evaporation, the ethyl acetate solvent softens the saran surface to permit intimate bonding with the ink layer.

| Ingredients | Parts by Weight |
|---|---|
| Vinyl chloride-vinyl acetate copolymer (Vinylite VYHH) | 10 |
| Mineral oil | 8 |
| Lanolin | 12 |
| Alkali blue | 10 |
| Toluol | 15 |
| Ethyl acetate | 45 |

The coated web is then cut into sheets or ribbons to produce reusable squeeze-out type transfer elements which provide exceptionally clear, sharp duplicate images under the effects of imaging pressure.

Ribbons produced according to the Examples have much greater dimensional stability under changes in temperature and/or humidity than ribbons having a film foundation consisting of any of the named films used alone. The ribbons are wound onto spools and subjected to changes in temperature and/or humidity and periodically checked at opposite extremes and very little variation in the tightness or looseness of the ribbon on the spool can be detected.

Carbon sheets produced according to the Examples have similar dimensional stability and have far less tendency to curl or roll under the effects of changes in temperature and/or humidity than carbon sheets having a film foundation consisting of any of the single films mentioned.

Variations and modifications may be made within the scope of the claims and portions of the improvements may be used without others.

I claim:

1. A pressure-sensitive transfer element comprising a plastic film foundation carrying a solidified layer comprising pressure-transferable imaging material which is transferable to a copy sheet under the effects of typing pressure, said foundation comprising a laminate of two different extruded plastic films, each having a maximum caliper of about 1 mil, one said film having an impact strength greater than about 40 kg/cm and low deformability under the effects of typing pressure and the other of said film having an impact strength below about 20 kg/cm but deforming easily about a type face under the effects of typing pressure, said films being bonded together by means of a thin adhesive intermediate layer to form a laminate having greater deformability under the effects of typing pressure than the said one film and greater impact strength than the said other film and having greater dimensional stability under the effects of changes in temperature and humidity than either of said films per se.

2. A pressure-sensitive transfer element according to claim 1 in which the said other film is a polyolefin film and the layer comprising imaging material is an oleophilic wax layer which is present on said polyolefin film and has a strong affinity therefor.

3. A pressure-sensitive transfer element according to claim 1 in which the layer comprising imaging material is solvent-bonded to the surface of one of the two films of the laminate, having been applied thereto by means of a volatile solvent which is a solvent for the film to which the layer is applied but a non-solvent for the other film of the laminate.

4. A pressure-sensitive transfer element according to claim 1 in which the foundation comprises a laminate of polyethylene terephthalate polyester as the one film and a polyolefin as the other film.

5. A pressure-sensitive transfer element according to claim 1 in which the layer on the foundation is of the frangible pressure-transferable type for one-time use.

6. A pressure-sensitive transfer element according to claim 1 in which the layer on the foundation comprises a porous structure of synthetic thermoplastic resin containing within the pores thereof said imaging material.

* * * * *